(12) United States Patent
Kim et al.

(10) Patent No.: US 12,252,150 B2
(45) Date of Patent: Mar. 18, 2025

(54) METHOD AND APPARATUS FOR TRACKING OBJECT USING LIDAR SENSOR AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Nam Gyun Kim, Seongnam-si (KR); Mu Gwan Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 16 days.

(21) Appl. No.: 17/701,290

(22) Filed: Mar. 22, 2022

(65) Prior Publication Data

US 2022/0363288 A1 Nov. 17, 2022

(30) Foreign Application Priority Data

May 4, 2021 (KR) .................. 10-2021-0057744

(51) Int. Cl.
*B60W 60/00* (2020.01)
*G06V 20/58* (2022.01)

(52) U.S. Cl.
CPC .......... *B60W 60/001* (2020.02); *G06V 20/58* (2022.01); *B60W 2420/408* (2024.01); *B60W 2554/4041* (2020.02); *B60W 2554/4049* (2020.02)

(58) Field of Classification Search
CPC .......... B60W 60/001; B60W 2420/52; B60W 2554/4041; B60W 2554/4049; G06V 20/58; G01S 7/4808; G01S 17/89; G01S 17/931; G01S 13/72; G01S 13/931; G01S 7/497; G06F 18/23

See application file for complete search history.

(56) References Cited

U.S. PATENT DOCUMENTS

| | | | |
|---|---|---|---|
| 2019/0114485 A1* | 4/2019 | Chan | H04N 21/4662 |
| 2019/0279420 A1* | 9/2019 | Moreno | G06T 17/10 |
| 2019/0311502 A1* | 10/2019 | Mammou | G06T 9/001 |
| 2021/0279950 A1* | 9/2021 | Phalak | G06T 7/55 |

* cited by examiner

*Primary Examiner* — Ig T An
(74) *Attorney, Agent, or Firm* — Slater Matsil, LLP

(57) ABSTRACT

A method of tracking an object includes checking points generated by a LiDAR sensor to determine a first interpolation reference point and a second interpolation reference point when there are missing points being associated with the object, and generating interpolation points to replace the missing points between the first interpolation reference point and the second interpolation reference point.

17 Claims, 19 Drawing Sheets

610A

620A

FIG. 18A
FIG. 18B
FIG. 18C
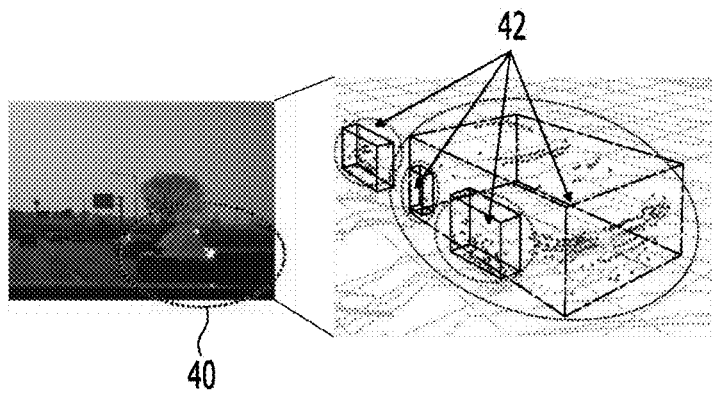
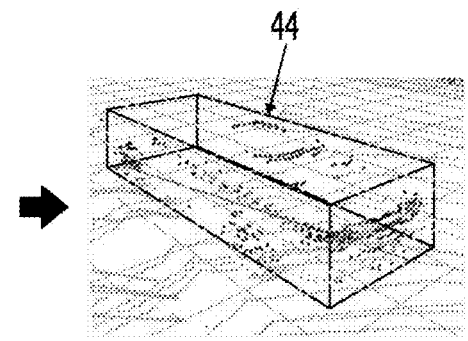
FIG. 19A
FIG. 19B
FIG. 19C
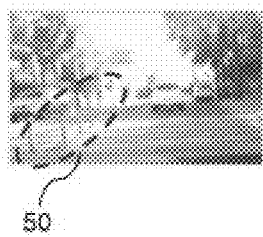
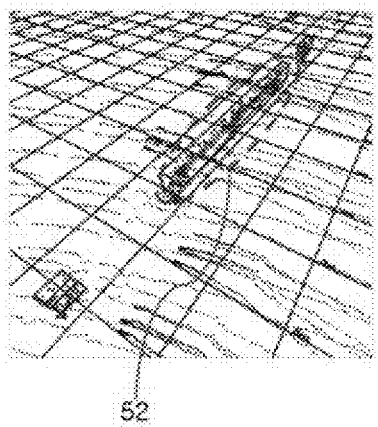
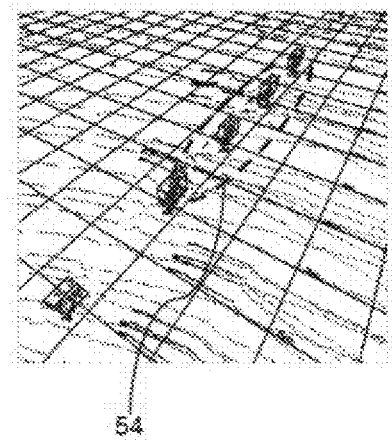

METHOD AND APPARATUS FOR TRACKING OBJECT USING LIDAR SENSOR AND RECORDING MEDIUM STORING PROGRAM TO EXECUTE THE METHOD

CROSS-REFERENCE TO RELATED APPLICATIONS

This application claims the benefit of Korean Patent Application No. 10-2021-0057744, filed on May 4, 2021, which application is hereby incorporated herein by reference.

TECHNICAL FIELD

Embodiments relate to a method and apparatus for tracking an object using a LiDAR sensor and to a recording medium storing a program to execute the method.

BACKGROUND

Various technologies are being developed for autonomous driving of vehicles. For example, information on a target vehicle may be obtained using a light detection and ranging (LiDAR) sensor, and an autonomous driving function of a vehicle may be supported using the obtained information. However, in some cases, due to the characteristics of a target object, a point cloud may not be obtained accurately through a LiDAR sensor, thus incurring over-segmentation in which a single object is recognized as multiple objects rather than as one object. Therefore, research with the goal of solving this problem is underway.

SUMMARY

Accordingly, embodiments are directed to a method and apparatus for tracking an object using a LiDAR sensor and to a recording medium storing a program to execute the method that substantially obviate one or more problems due to limitations and disadvantages of the related art.

Embodiments provide a method and apparatus for tracking an object using a LiDAR sensor, which exhibit excellent object-tracking performance, and a recording medium storing a program to execute the method.

However, the features of the embodiments are not limited to the above-mentioned features, and other features not mentioned herein will be clearly understood by those skilled in the art from the following description.

A method of tracking an object using a LiDAR sensor according to an embodiment may include checking points generated by the LiDAR sensor to determine a first interpolation reference point and a second interpolation reference point when there are missing points associated with the object and generating interpolation points to replace the missing points between the first interpolation reference point and the second interpolation reference point.

For example, the method may further include performing primary labeling on segmented points including the interpolation points to generate first clusters, checking the density of the interpolation points to find a target cluster on which secondary labeling is to be performed among the first clusters, and performing the secondary labeling on the target cluster to generate a second cluster.

For example, the determining a first interpolation reference point may include determining a candidate for the first interpolation reference point, checking whether the candidate is a point that can be recognized as the object, and determining the candidate to be the first interpolation reference point depending on a result of the checking.

For example, the determining a second interpolation reference point may include checking, subsequent to the first interpolation reference point, whether there is a missing point, and, when a point is generated again after there is the missing point, determining the point generated again to be the second interpolation reference point.

For example, when it is determined that points are missing in the same scan section as a result of checking of a scan pattern of the points, the first interpolation reference point and the second interpolation reference point may be determined.

For example, the method may further include checking whether it is necessary to generate the interpolation points based on the first interpolation reference point and the second interpolation reference point.

For example, the checking whether it is necessary to generate the interpolation points may include at least one of checking whether a target layer to which missing points belong is within a threshold layer range, checking whether the number of the missing points is greater than a threshold missing number, checking whether the spacing distance between the first interpolation reference point and the second interpolation reference point is longer than a threshold spacing distance, or checking whether the first interpolation reference point and the second interpolation reference point are located in a region of interest. Whether to generate the interpolation points may be determined using a result of the checking.

For example, at least one of the threshold layer range, the threshold missing number, the threshold spacing distance, or the range of the region of interest may be changed depending on the first interpolation reference point and the second interpolation reference point.

For example, the interpolation points may be generated so as to be spaced apart from each other at regular intervals in an imaginary straight line interconnecting the first interpolation reference point and the second interpolation reference point.

For example, a first labeling threshold value used to generate the first clusters and a second labeling threshold value used to generate the second cluster may be different from each other.

For example, the second labeling threshold value may be divided so as to have a smaller size than the first labeling threshold value.

For example, the finding a target cluster may include at least one of checking whether the first clusters are located in the region of interest, checking whether the number of points generated by the LiDAR sensor among points included in the first clusters is smaller than a threshold generating number, or checking whether the density of the interpolation points among the points included in the first clusters is greater than a threshold density. The target cluster may be selected from among the first clusters using a result of the checking.

For example, at least one of the range of the region of interest, the threshold generating number, or the threshold density may be changed depending on the first interpolation reference point and the second interpolation reference point.

An apparatus for tracking an object using a LiDAR sensor according to another embodiment may include a segmentation unit configured to segment points generated by the LiDAR sensor and a clustering unit configured to cluster the segmented points. The segmentation unit may include a point determiner configured to check the generated points to determine a first interpolation reference point and a second interpolation reference point when there are missing points associated with the object, an interpolation inspector configured to check whether it is necessary to generate interpolation points based on the first interpolation reference point and the second interpolation reference point, and a point generator configured to generate the interpolation points to replace missing points between the first interpolation reference point and the second interpolation reference point in response to a result of the checking.

For example, the clustering unit may include a first clustering unit configured to perform primary labeling on segmented points including the interpolation points to generate first clusters, a cluster inspector configured to check the density of the interpolation points to find a target cluster on which secondary labeling is to be performed among the first clusters, and a second clustering unit configured to perform the secondary labeling on the target cluster to generate a second cluster.

For example, a first labeling threshold value used to generate the first clusters and a second labeling threshold value used to generate the second cluster may be different from each other.

According to still another embodiment, a recording medium in which a program for executing a method of tracking an object using a LiDAR sensor is recorded may store a program to implement a function of checking points generated by the LiDAR sensor to determine a first interpolation reference point and a second interpolation reference point when there are missing points associated with the object and a function of generating interpolation points to replace missing points between the first interpolation reference point and the second interpolation reference point. The recording medium may be read by a computer system.

For example, the recording medium may store a program to further implement a function of performing primary labeling on segmented points including the interpolation points to generate first clusters, a function of checking the density of the interpolation points to find a target cluster on which secondary labeling is to be performed among the first clusters, and a function of performing the secondary labeling on the target cluster to generate a second cluster. The recording medium may be read by a computer system.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain principles of embodiments of the invention. In the drawings:

FIGS. 18A to 18C are diagrams showing a comparison between the comparative example and the embodiment; and FIGS. 19A to 19C are diagrams showing an example of prevention of under-segmentation.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method 100 and an apparatus 1000 for tracking an object using a light detection and ranging (LiDAR) sensor and a recording medium storing a program to execute the method 100 according to embodiments will be described with reference to the accompanying drawings.

The method 100 and the apparatus 1000 for tracking an object using the LiDAR sensor and the recording medium storing a program to execute the method 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, according to another embodiment, the x-axis, the y-axis, and the z-axis may intersect each other obliquely.

Figure 1:
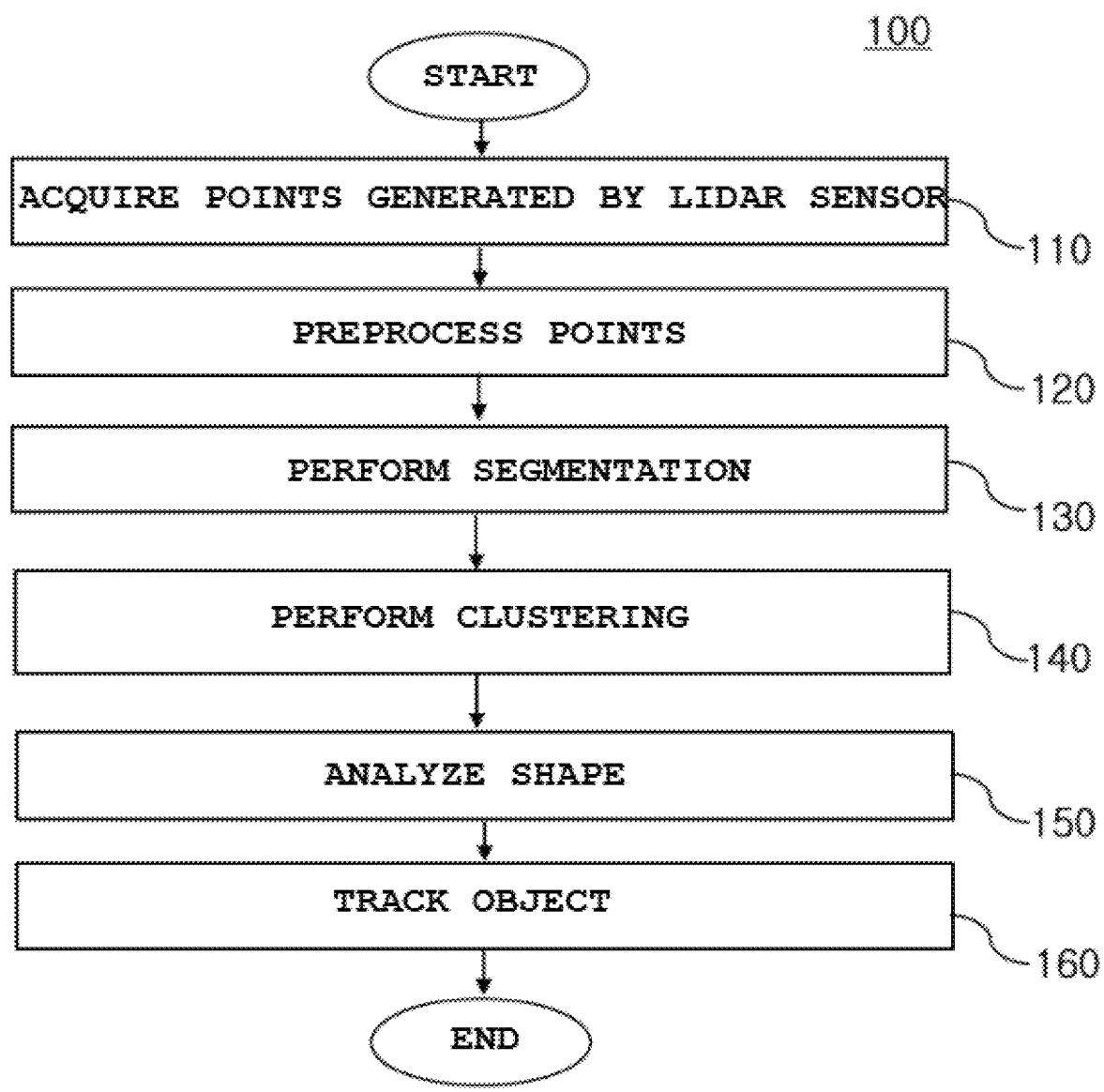
FIG. 1 is a flowchart showing an object-tracking method according to an embodiment.
Figure 2:
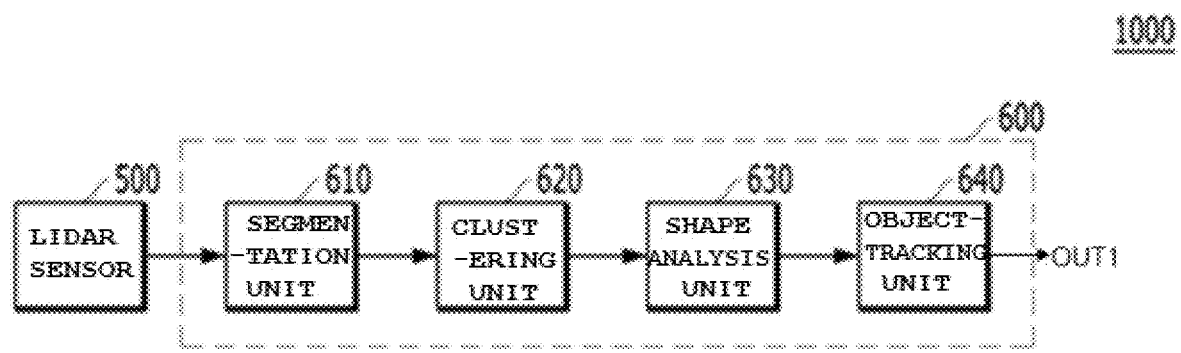
FIG. 2 is a schematic block diagram of an object-tracking apparatus according to an embodiment.

FIG. 1 is a flowchart showing an object-tracking method 100 according to an embodiment, and FIG. 2 is a schematic block diagram of an object-tracking apparatus 1000 according to an embodiment.

The object-tracking method 100 shown in FIG. 1 will be described as being performed by the object-tracking apparatus 1000 shown in FIG. 2, but the embodiments are not limited thereto. That is, according to another embodiment, the object-tracking method 100 shown in FIG. 1 may also be performed by an apparatus configured differently from the object-tracking apparatus 1000 shown in FIG. 2.

The object-tracking apparatus 1000 may include a LiDAR sensor 500 and a LiDAR controller 600.

According to the object-tracking method 100 according to the embodiment, object-associated points (or a point cloud) generated by the LiDAR sensor 500 are first acquired (step 110).

The LiDAR sensor 500 may be provided in a plural number, and the plurality of LiDAR sensors 500 may be mounted at various positions on a vehicle (hereinafter referred to as a "host vehicle"). For example, the LiDAR sensors 500 may be disposed at various positions on the host vehicle, such as at the roof, the front side portions, and the rear side portions of the host vehicle. However, the embodiments are not limited to any specific position at which the LiDAR sensor 500 is disposed in the host vehicle or to any specific number of LiDAR sensors 500.

For example, the LiDAR sensor 500 may fire (or radiate or emit) a single circular laser pulse (or laser beam) having a wavelength of 905 nm to 1550 nm to an object, and may measure the time taken for the laser pulse reflected from an object present within a measurement range to return, thereby sensing information on the object, for example, the distance from the LiDAR sensor 500 to the object, the orientation of the object, the speed of the object, the temperature of the object, the material distribution of the object, and the concentration characteristics of the object. Here, the object may be, for example, another vehicle, a person, or an obstacle present outside the host vehicle equipped with the LiDAR sensor 500. However, the embodiments are not limited to any specific type of object.

The LiDAR controller 600 may include a segmentation unit 610, a clustering unit 620, a shape analysis unit 630, and an object-tracking unit 640 (e.g., a tracking unit, a tracking and classification unit, or an object-detecting unit).

After step no, the points generated by the LiDAR sensor 500 may be preprocessed (step 120). To this end, the LiDAR controller 600 shown in FIG. 2 may further include a preprocessing unit (not shown). The preprocessing unit may remove data pertaining to reflections from the body of the host vehicle. That is, since there is a region that is shielded by the body of the host vehicle depending on the mounting position and the field of view of the LiDAR sensor 500, the preprocessing unit may remove data pertaining to reflections from the body of the host vehicle using a reference coordinate system.

According to the embodiment, as shown in FIG. 2, the preprocessing unit may be omitted from the LiDAR controller 600.

After step 120, segmentation is performed on the points generated by the LiDAR sensor 500 (step 130). In order to perform step 130, the segmentation unit 610 may receive the points generated by the LiDAR sensor 500, may perform segmentation on each point, and may output the segmented points to the clustering unit 620.

Here, the term "segmentation" refers to a process of recognizing the type of points generated by the LiDAR sensor 500. That is, a process of recognizing whether the points generated by the LiDAR sensor 500 are points associated with a building, points associated with a pedestrian, points associated with a road surface, or points associated with another vehicle may be referred to as "segmentation".

After step 130, clustering is performed on the segmented points (step 140). To this end, the clustering unit 620 clusters the points segmented by the segmentation unit 610 and outputs the result of clustering to the shape analysis unit 630. The term "clustering" refers to a process of classifying the segmented points into groups such that each group includes points associated with the same object. For example, in step 130, points associated with vehicles are recognized from among a plurality of points, and in step 140, the points recognized as being associated with vehicles are classified into groups such that each group includes points associated with the same vehicle.

The clustering unit 620 may group the points into clouds by applying a grid-based clustering method or a density-based clustering method thereto to generate a contour of the object. The result of sensing by the LiDAR sensor 500 shows a plurality of points, each of which has only information about the position (or coordinates) thereof. Therefore, the clustering unit 620 serves to group the segmented points for each object and to generate clusters, which are the result of grouping.

After step 140, the result of clustering is converted into a plurality of geometric box shapes for each channel in order to analyze the shape of the object (step 150). To this end, the shape analysis unit 630 may convert the result of clustering by the clustering unit 620 into a plurality of geometric box shapes for each channel, and may output at least one of the width, length, position, or orientation (or heading) of the box to the object-tracking unit 640 as information about the box.

After step 150, whether the object, the shape of which has been analyzed, is an obstacle, a vehicle, or a person may be tracked and recognized (step 160). To this end, the object-tracking unit 640 may track and recognize the type of object, the shape of which has been analyzed, and may output the result of recognition through an output terminal OUT1.

Although not illustrated, postprocessing may be performed after step 160, and the result of postprocessing may be output as a LiDAR track.

Hereinafter, an embodiment of the object-tracking method 100 using the LiDAR sensor shown in FIG. 1 will be described with reference to the accompanying drawings.

Figure 3:
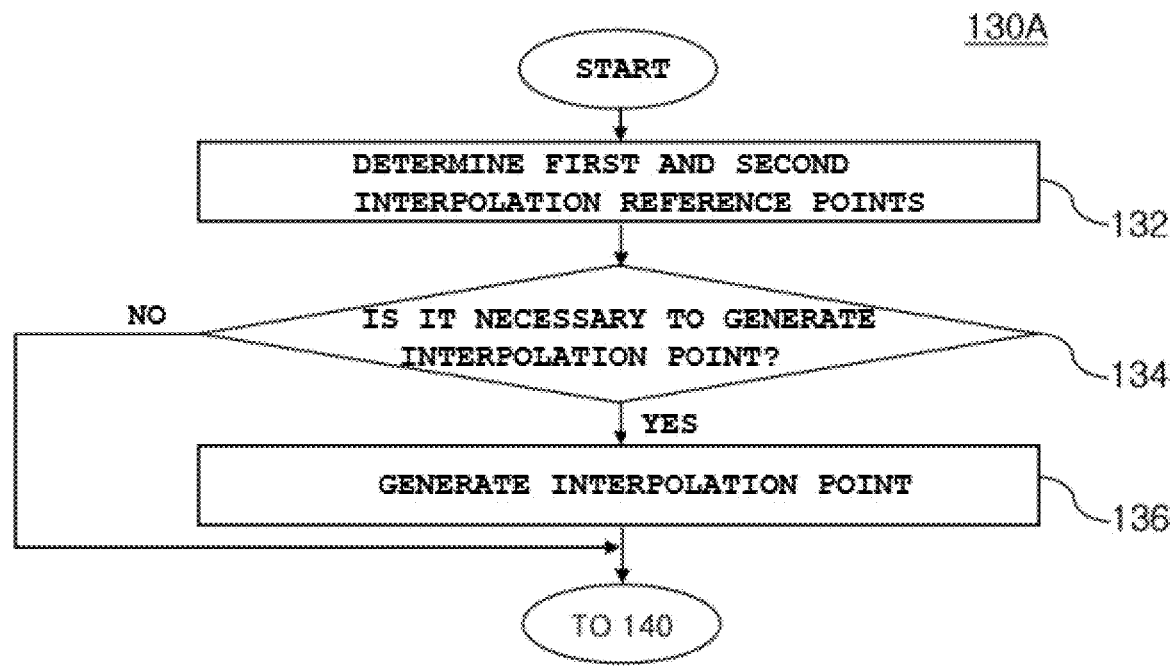
FIG. 3 is a flowchart showing an embodiment of step 130 shown in FIG. 1.

FIG. 3 is a flowchart showing an embodiment 130A of step 130 shown in FIG. 1.

Step 130A shown in FIG. 3 may be independently performed for each channel (i.e. layer).

The points generated by the LiDAR sensor 500 are checked, and when there is a missing point among the points associated with an object, first and second interpolation reference points are determined (step 132).

Figure 4:
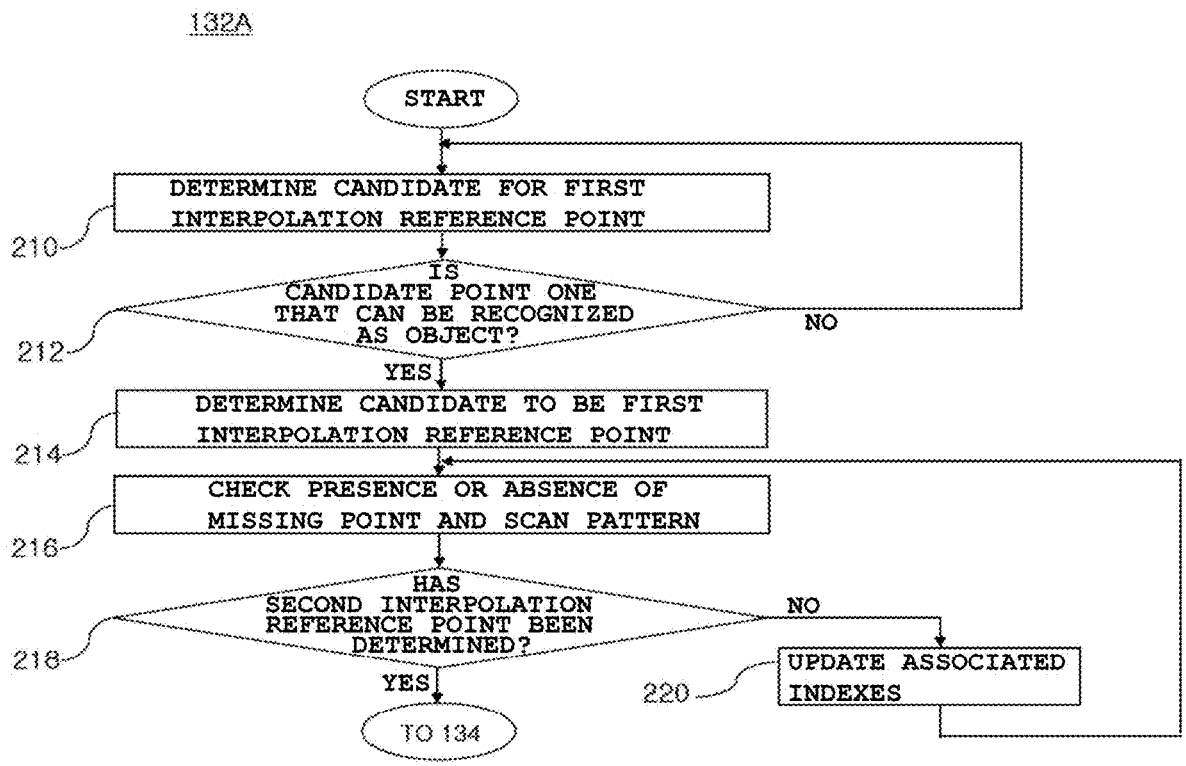
FIG. 4 is a flowchart showing an embodiment of step 132 shown in FIG. 3.

FIG. 4 is a flowchart showing an embodiment 132A of step 132 shown in FIG. 3.

First, a first interpolation reference point is determined among the points generated by the LiDAR sensor 500 (steps 210 to 214).

A candidate for the first interpolation reference point, among the points generated by radiating a laser pulse from the LiDAR sensor 500, is determined (step 210).

After step 210, whether the point determined to be the candidate is a point that can be recognized as the object is checked (step 212). To this end, the presence or absence of a missing point among the points acquired by radiating a laser pulse and the scan pattern of the points may be checked. The reason for this is to check whether the point determined to be the candidate is a point that can be recognized as the object by checking a point in a layer located in the vicinity of the layer to which the candidate belongs.

For example, even if there is a missing point, it is possible to determine, based on associated indexes IDX, whether the candidate point is a first interpolation reference point that can be recognized as the object through the relationship between the candidate point and neighboring points, for example, through a determination as to whether there is a point generated in a layer located above or below the layer to which the point determined to be the candidate belongs or whether the point is vertically aligned with the point determined to be the candidate, if any.

When it is determined that the candidate point is a point that can be recognized as the object (YES to step 212), the candidate point is determined to be the first interpolation reference point (step 214). On the other hand, when it is determined that the candidate point is not a point that can be recognized as the object (NO to step 212), the process proceeds to step 210 in order to again find a candidate for the first interpolation reference point.

After the first interpolation reference point is determined, a second interpolation reference point is determined (steps 216 to 220).

Subsequent to the determination of the first interpolation reference point, whether there is a missing point is checked (step 216). To this end, the presence or absence of a missing point among the points generated by again radiating a laser pulse from the LiDAR sensor 500 and the scan pattern of the points may be checked.

Whether a second interpolation reference point has been determined based on the result of checking in step 216 is checked (step 218).

If a second interpolation reference point has not been determined based on the result of checking in step 216 (NO to step 218), the layer-associated indexes may be updated (step 220), and a laser pulse may again be radiated in order to repeatedly perform steps 216 to 218.

Here, the term "associated indexes" refers to all indexes associated with the scan pattern. For example, the associated indexes include an index for checking data at the time of radiation of a laser pulse and indexes of laser pulses radiated from the left side, right side, upper side, and lower side of the laser index.

However, based on the result of checking in step 216, when it is determined that when a point is generated again after there is a missing point after radiation of a laser pulse in the same layer, the point generated again may be determined to be a second interpolation reference point.

Hereinafter, an example of generation of the first and second interpolation reference points by checking the presence or absence of missing points and the scan patterns of the points will be described with reference to the accompanying drawings.

Figure 5:
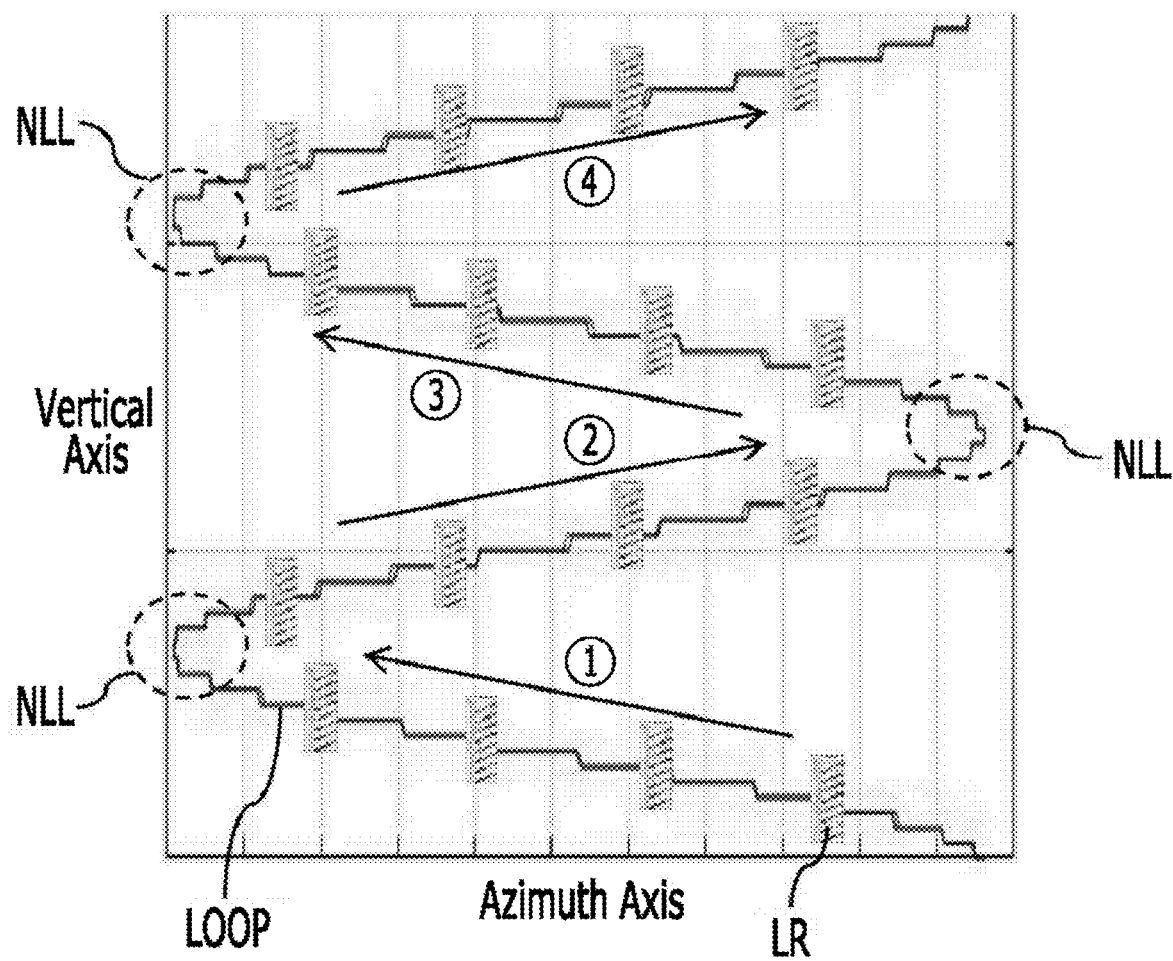
FIG. 5 exemplarily shows a LiDAR scan pattern for generating a frame.
Figure 6:
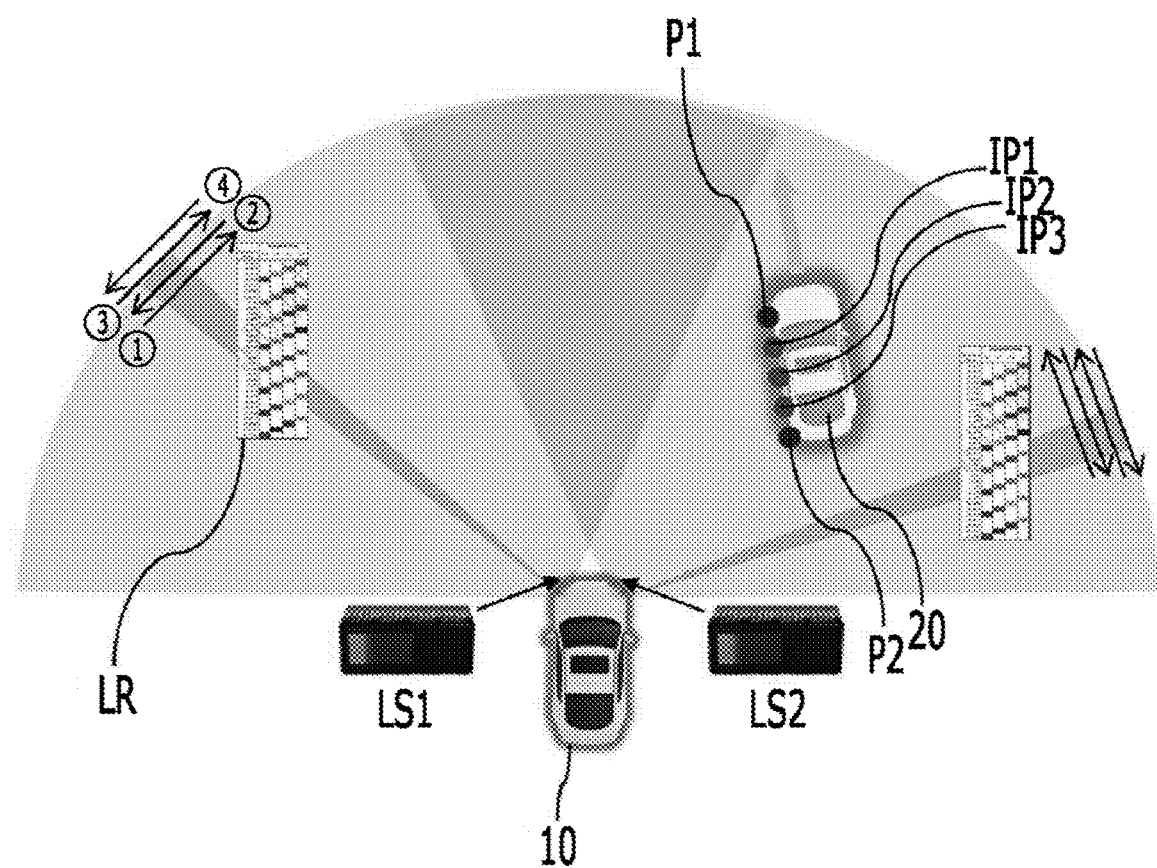
FIG. 6 is a diagram for explaining step 130A shown in FIG. 3.

FIG. 5 exemplarily shows a LiDAR scan pattern for generating a frame, and FIG. 6 is a diagram for explaining step 130A shown in FIG. 3.

The term "frame" refers to a point cloud input in a unit step. Here, the term "unit step" refers to a single process in which the LiDAR controller 600 receives and processes a plurality of points from the LiDAR sensor 500 and outputs the result of processing through the output terminal OUT1.

In the case of FIG. 5, four scan sections ①, ②, ③ and ④ are illustrated by way of example. Here, the term "scan section" refers to an angular region in which a laser pulse scans an object during a unit step. A multi-channel laser radiation plate LR may move along a LiDAR MEMS/motor trajectory LOOP to generate a point cloud. The laser radiation plate LR is a plate in which lasers are provided, and is located in the LiDAR sensor. The laser radiation plate LR may function to periodically radiate and receive a laser pulse. Referring to FIG. 6, the laser radiation plate LR may be located in each of two front lateral LiDAR sensors LS1 and LS2, which are mounted in the host vehicle 10.

The LiDAR MEMS/motor trajectory LOOP may include a nonlinear trajectory NLL and a linear trajectory. The nonlinear trajectory NLL is located between the scan sections on the trajectory LOOP, and the direction thereof is nonlinearly changed according to the scan sections. The linear trajectory is located between the nonlinear trajectories NLL on the trajectory LOOP, and has linearity at a constant angle in one direction.

When it is determined that points are missing in the same scan section as a result of checking the scan pattern of the generated points, the first and second interpolation reference points may be determined. The reason for this is that, even if there are missing points, when the missing points are located between different scan sections, rather than in the same scan section, the missing points are located within the nonlinear trajectory NLL, resulting in a large error during linear interpolation. Therefore, when points are not missing in the same scan section, the first and second interpolation reference points are not determined.

Referring to FIGS. 5 and 6, among the points sensed by receiving a laser pulse that is radiated from the host vehicle 10 and is reflected from a lateral portion of another vehicle 20, missing points are present in the same scan section, so the first and second interpolation reference points P1 and P2 are determined.

In this way, missing points may be present between the first and second interpolation reference points P1 and P2, and the first and second interpolation reference points P1 and P2, which are located in the same scan section as the missing points, may be determined.

Referring again to FIG. 3, after step 132, whether it is necessary to generate an interpolation point is checked based on the first interpolation reference point and the second interpolation reference point (step 134).

Figure 7:
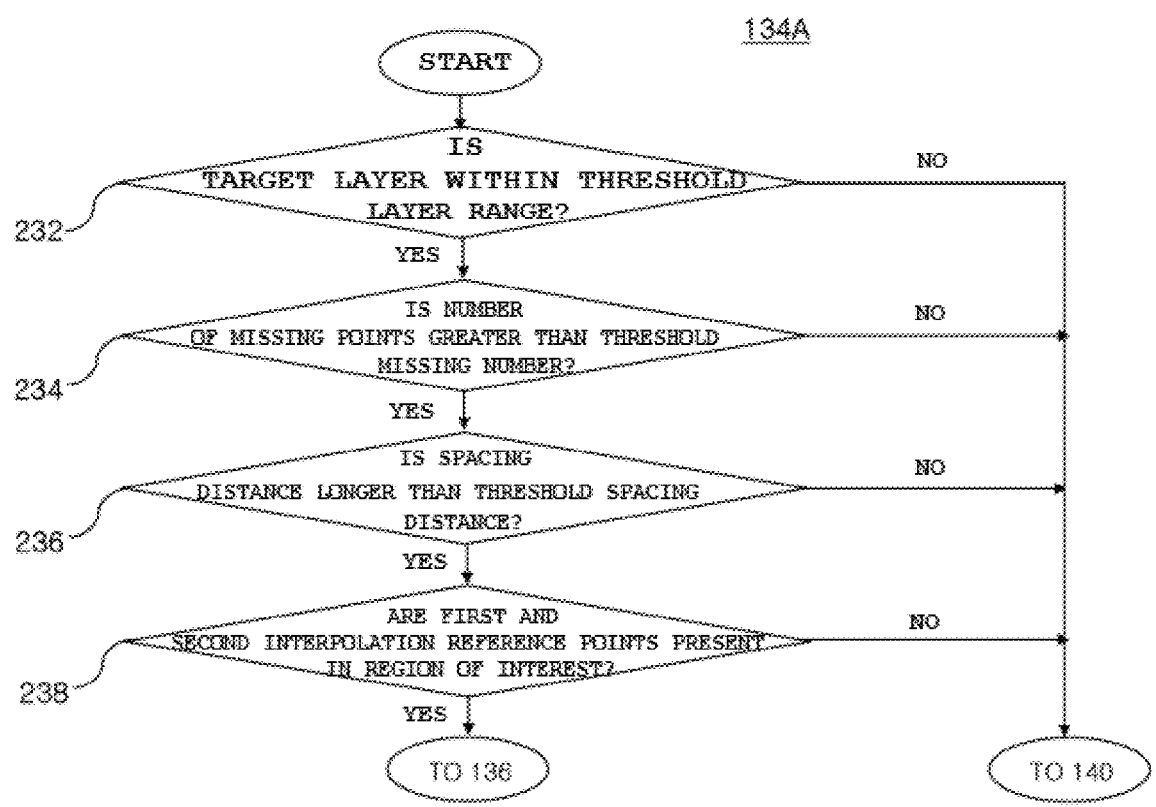
FIG. 7 is a flowchart showing an embodiment of step 134 shown in FIG. 3.

FIG. 7 is a flowchart showing an embodiment 134A of step 134 shown in FIG. 3.

After step 132, whether the layer to which the missing points belong (hereinafter referred to as a "target layer") is within a threshold layer range is checked (step 232). As described above, step 130A shown in FIG. 3 is independently performed for each layer. In this case, the target layer is a layer on which step 130A is performed. Also, the target layer may be a layer in which the first and second interpolation reference points P1 and P2 are determined and an interpolation point is generated.

In addition, whether the number of missing points is greater than a threshold missing number is checked (step 234).

In addition, whether the spacing distance between the first and second interpolation reference points (hereinafter referred to as a "spacing distance") is longer than a threshold spacing distance is checked (step 236).

In addition, whether the first and second interpolation reference points are located in a region of interest (ROI) is checked (step 238).

According to the embodiment, when at least one of step 232, step 234, step 236, or step 238 shown in FIG. 7 is satisfied, it may be determined that it is necessary to generate an interpolation point, and the process may proceed to step 136.

For example, as shown in FIG. 7, when all of steps 232, 234, 236 and 238 are satisfied, it may be determined that it is necessary to generate an interpolation point, and the process may proceed to step 136. When not all of steps 232, 234, 236 and 238 are satisfied, it may be determined that it is not necessary to generate an interpolation point, and the process may proceed to step 140.

It is illustrated in FIG. 7 that steps 232, 234, 236 and 238 are sequentially performed, but the embodiment is not limited thereto. That is, steps 232, 234, 236 and 238 may be performed in any order.

In addition, since the spacing distance between the LiDAR sensor and the object and the point density are inversely proportional to each other, at least one of the threshold layer range, the threshold missing number, the threshold spacing distance, or the range of the region of interest may be changed to have different values depending on the coordinate values of the first and second interpolation reference points.

Hereinafter, a method of tuning each of the threshold layer range, the threshold missing number, the threshold spacing distance, and the region of interest (ROI) (hereinafter referred to as a "first threshold value") according to the embodiment will be described.

The first threshold value may be determined through an ROI-based two-dimensional look-up table (LUT). In addition, the first threshold value may be accumulated and tuned based on traveling data (logging data), with priority given to prevention of incorrect operation (i.e. from the perspective of false-negative).

For example, incorrect operation occurrence data information, coordinates, the minimum or maximum first threshold value for preventing incorrect operation, and explanation of an incorrect operation occurrence situation may be recorded in an incorrect operation occurrence data accumulation table for tuning the ROI-based two-dimensional look-up table.

The tuning of the first threshold value from the perspective of false-negative (with priority given to prevention of incorrect operation) may be performed by combining a learning (optimization) method and a selection (heuristic) method. A break point for each first threshold value is selected, and a tuning parameter, which is subject to learning and selection, is a break point of the two-dimensional look-up table.

FIGS. 8A to 10B are diagrams for explaining tuning of the first threshold value.

According to an embodiment, the first threshold value may be tuned as follows. Hereinafter, the term "tuning parameter" refers to the first threshold value.

Figure 8A:
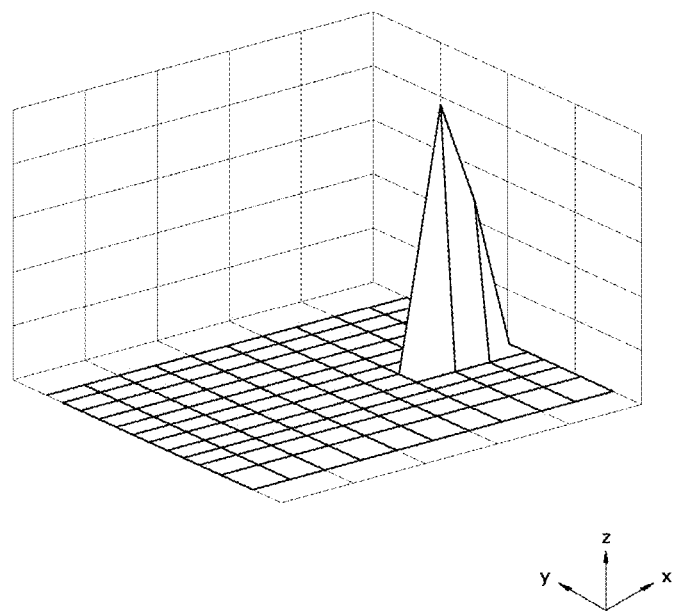
FIGS. 8A, 8B, 9A, 9B, 10A, and 10B are diagrams for explaining tuning of a first threshold value.
Figure 8B:
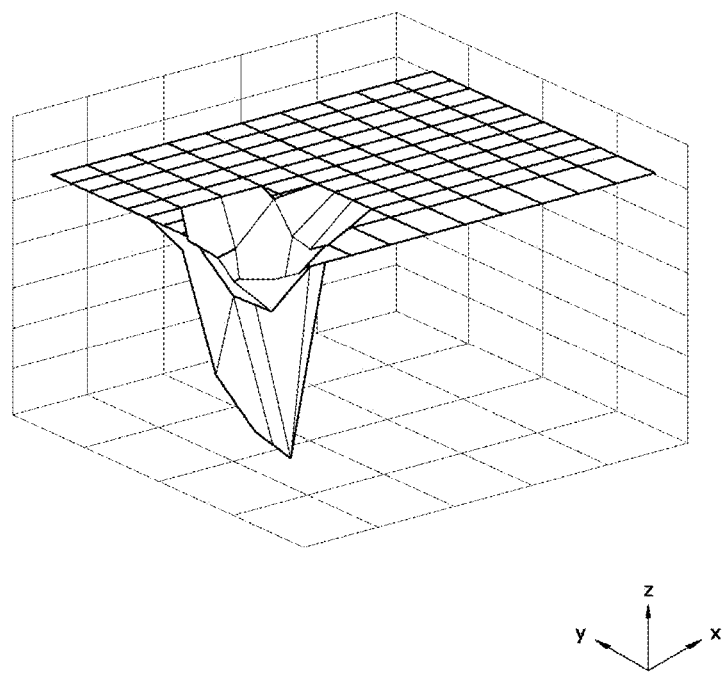

First, an initial value of the tuning parameter is determined. For example, FIG. 8A shows the initial value of a first tuning parameter, and FIG. 8B shows the initial value of a second tuning parameter.

Thereafter, information about a misrecognition (i.e. incorrect recognition) situation is stored in a database. For example, "incorrect operation occurrence data information", "incorrect operation object information", and "incorrect operation object ground truth (GT) information" may be recorded in respective databases. Examples of the information that is recorded in each list in the database are as follows.

Information about the driving vehicle, the driving date, the driving sensor, and the incorrect operation occurrence frame may be recorded in the list of the "incorrect operation occurrence data information". Information about the position of the object, the size of the object, and other attributes of the object may be recorded in the list of the "incorrect operation object information". Information about the labeling of the GT cluster, the position of the GT cluster, the size of the GT cluster, and other attributes of the GT cluster may be recorded in the list of the "incorrect operation object GT information".

Figure 9A:
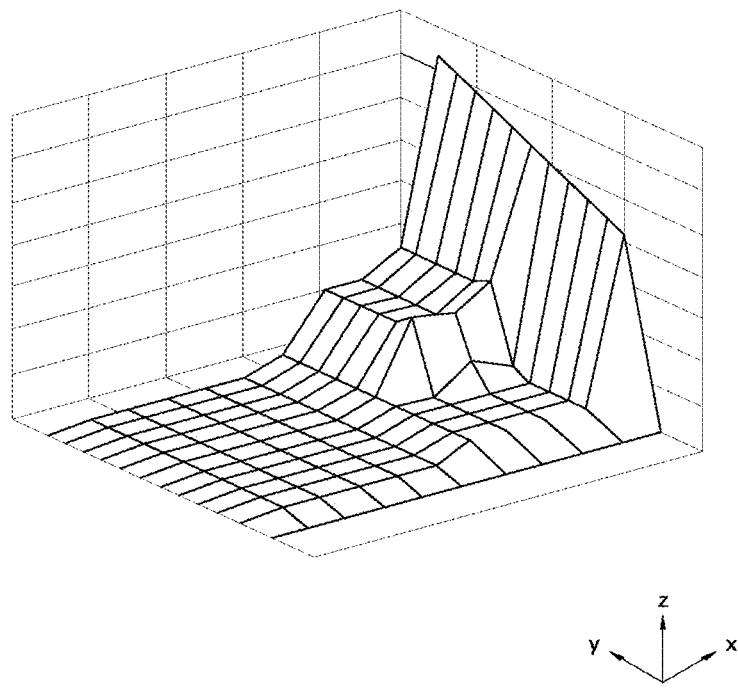
Figure 9B:
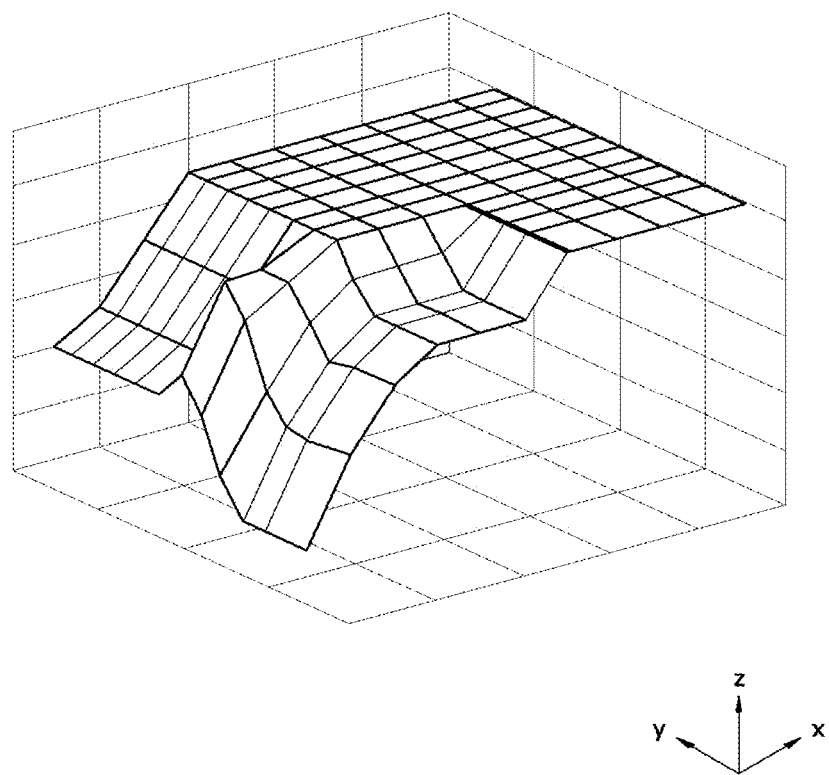

Thereafter, a tuning parameter for avoiding a misrecognition situation is detected in the database. For example, this may be performed using a gradient descent (optimization) method. FIG. 9A shows the learning (optimization) value of the first parameter, and FIG. 9B shows the learning value of the second parameter.

Thereafter, post-processing (e.g. a heuristic process) is performed on the detected tuning parameter. Here, the term "post-processing" refers to an operation of interpolating a tuning parameter using a point at which at least one detected tuning parameter has the maximum point coordinate values. For example, simplification, normalization and scaling processes may be performed for the post-processing.

Figure 10A:
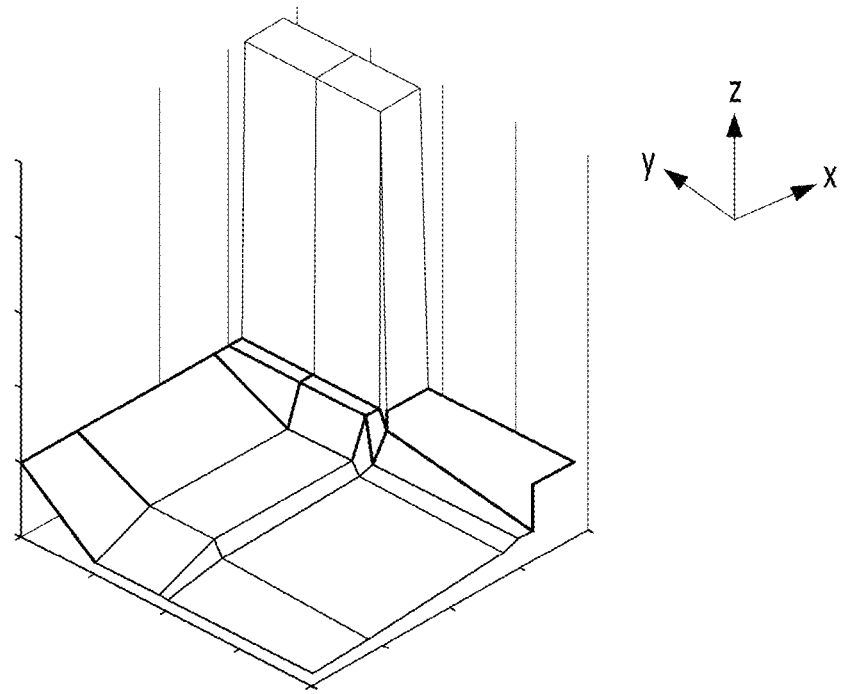
Figure 10B:
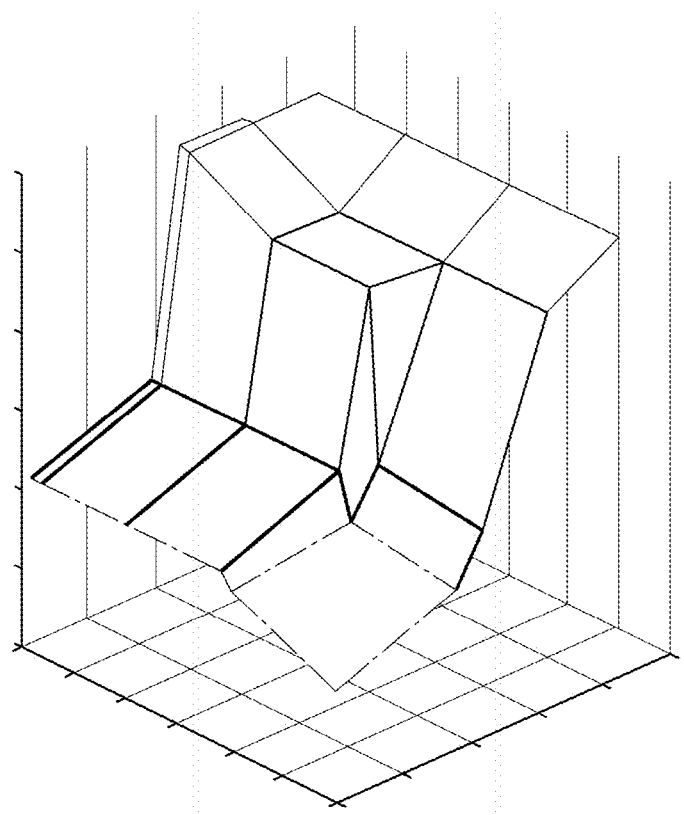

Thereafter, the post-processed tuning parameter is determined. For example, the tuning parameter may be determined by obtaining the coordinates of the result of interpolation. FIG. 10A shows the determined value of the first parameter, and FIG. 10B shows the determined value of the second parameter.

Examples of variables used to determine a tuning parameter, which is subject to learning and selection, are shown in Table 1 below.

TABLE 1

| Class. | Parameter Name | Unit | Value |
|---|---|---|---|
| 1 | CH_LOW | — | Parameter associated with lower limit value of threshold layer range used in step 232 shown in FIG. 7 |
| 2 | CH_HIGH | — | Parameter associated with upper limit value of threshold layer range used in step 232 shown in FIG. 7 |
| 3 | VALIDPNT | — | Parameter associated with threshold missing number used in step 234 shown in FIG. 7 |
| 4 | XDIFF | m | Parameter associated with value of threshold spacing distance in x-axis direction used in step 236 shown in FIG. 7 |
| 5 | YDIFF | m | Parameter associated with value of threshold spacing distance in y-axis direction used in step 236 shown in FIG. 7 |
| 6 | ZDIFF | m | Parameter associated with value of threshold spacing distance in z-axis direction used in step 236 shown in FIG. 7 |
| 7 | XRANGE | m | Parameter associated with range of region of interest in x-axis direction used in step 238 shown in FIG. 7 |
| 8 | YRANGE | m | Parameter associated with range of region of interest in |

TABLE 1-continued

| Class. | Parameter Name | Unit | Value |
|---|---|---|---|
| 9 | ZRANGE | M | y-axis direction used in step 238 shown in FIG. 7<br>Parameter associated with range of region of interest in z-axis direction used in step 238 shown in FIG. 7 |

In Table 1, the range of the region of interest is based on the position of the LiDAR sensor mounted in the host vehicle.

Referring again to FIG. 3, when it is determined that it is necessary to generate an interpolation point, an interpolation point is generated in order to replace a missing point between the first interpolation reference point and the second interpolation reference point (step 136).

Figure 11A:
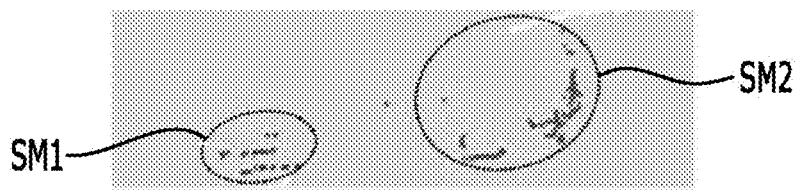
FIGS. 11A to 11C are diagrams for helping understanding step 130A shown in FIG. 3.
Figure 11B:
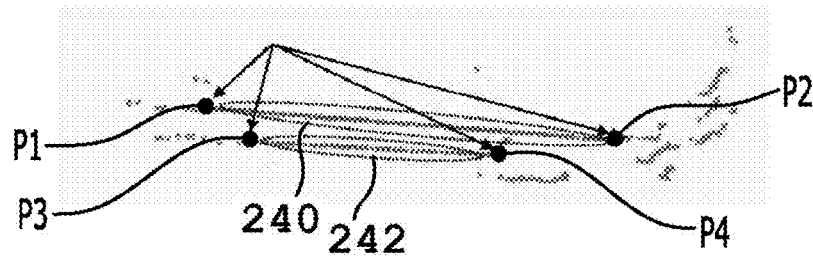
Figure 11C:
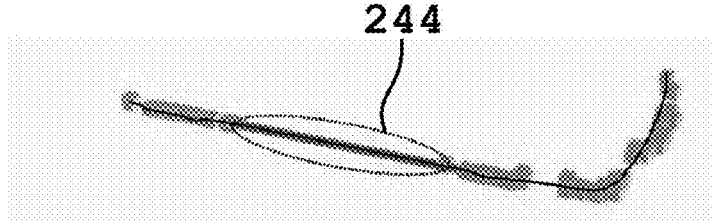

FIGS. 11A to 11C are diagrams for aiding understanding of step 130A shown in FIG. 3.

As shown in FIG. 11A, over-segmentation, in which two segments SM1 and SM2 are generated with respect to one object due to a missing point, may occur. Here, over-segmentation refers to a phenomenon in which a single object is recognized as multiple objects rather than one object.

Therefore, in step 132, as shown in FIG. 11B, when there is a missing point associated with the object, the first and second interpolation reference points P1 and P2 (or P3 and P4) are determined. Thereafter, when it is determined that it is necessary to generate an interpolation point, an interpolation point is generated to replace a missing point in the region 240 (or 242) between the first and second interpolation reference points P1 and P2 (or P3 and P4).

For example, referring to FIG. 6, when there is a missing point associated with the object, the first and second interpolation reference points P1 and P2 are determined. Thereafter, when it is determined that it is necessary to generate an interpolation point, interpolation points IP1, IP2 and IP3 are generated to replace the missing point in the region between the first and second interpolation reference points P1 and P2.

Also, for example, as shown in FIG. 11B, a plurality of interpolation points may be generated so as to be spaced apart from each other at regular intervals in an imaginary straight line interconnecting the first interpolation reference point P1 and the second interpolation reference point P2, and a plurality of interpolation points may be generated so as to be spaced apart from each other at regular intervals in an imaginary straight line interconnecting the first interpolation reference point P3 and the second interpolation reference point P4.

As described above, when a point associated with an object is not generated by the LiDAR sensor and thus is missing, an embodiment generates an interpolation point in order to replace the missing point. Accordingly, the clustering unit 620 clusters the segmented points including the interpolation point, and the shape analysis unit 630 generates a straight-line-shaped contour with respect to an interpolation section 244, in which the generated interpolation point is located, using the result of clustering, as shown in FIG. 11C, thereby recognizing the object as a single object.

Hereinafter, an embodiment of step 140 shown in FIG. 1 will be described with reference to the accompanying drawings.

Figure 12:
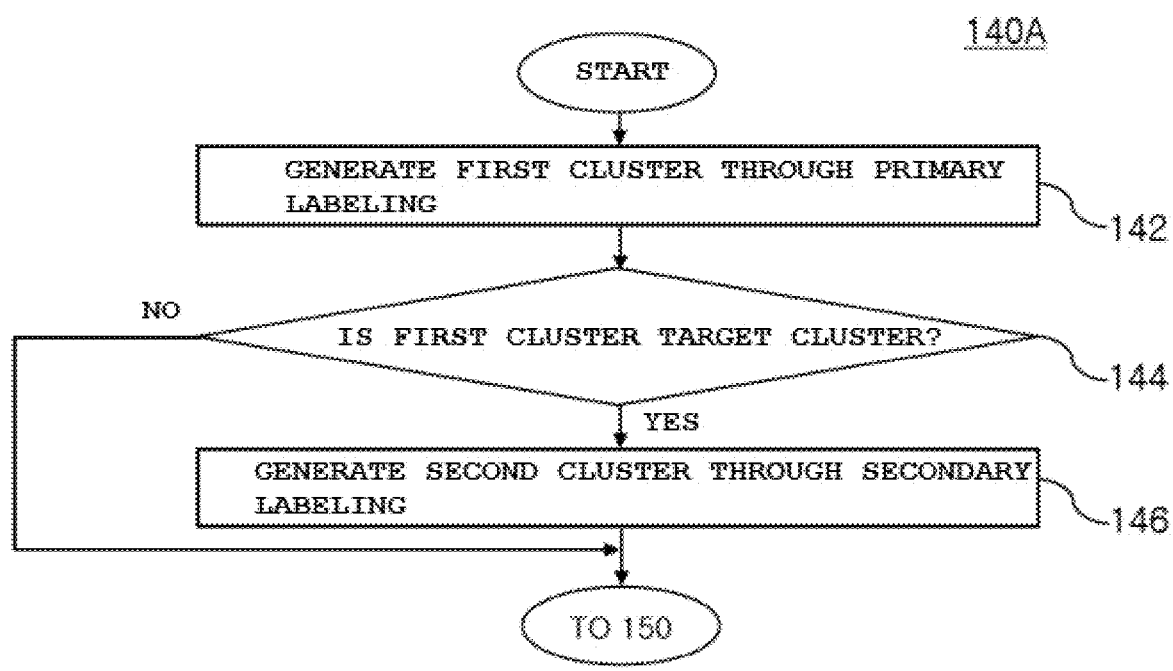
FIG. 12 is a flowchart showing an embodiment of step 140 shown in FIG. 1.

FIG. 12 is a flowchart showing an embodiment 140A of step 140 shown in FIG. 1.

According to the embodiment, after step 130, among the clusters generated through primary labeling (hereinafter referred to as "first clusters"), a cluster on which secondary labeling is to be performed (hereinafter referred to as a "target cluster") is found, and the secondary labeling is performed on the target cluster to generate a new cluster (hereinafter referred to as a "second cluster") (steps 142 to 146).

Here, the term "labeling" refers to an operation of, when a plurality of first clusters is generated by clustering the segmented points, assigning information indicating to which one of the plurality of first clusters each of the segmented points belongs.

First, after step 130, primary labeling is performed on the segmented points including the interpolation point in order to generate the first clusters (step 142).

For example, in order to perform step 142, the clustering unit 620 may include a grid map generator (not shown) and a labeling unit (not shown). The grid map generator generates a grid map with respect to the segmented points and outputs the generated grid map to the labeling unit. For example, the grid map generator may generate a two-dimensional (2D) grid map or a 2.5-dimensional (2.5D) grid map. The labeling unit may compare the spacing distance between a first point and a second point located in first and second grids, which are different from each other and are to be compared with each other, with a predetermined grid threshold value, and may allow the first and second grids to be included in the same cluster depending on the result of the comparison.

Step 142 may be performed in various ways, and the embodiment is not limited to any specific method of generating the first clusters.

After step 142, the target cluster on which the secondary labeling is to be performed is found among the first clusters (step 144). For example, the density of the interpolation points of each first cluster may be checked, and whether a corresponding first cluster corresponds to the target cluster may be checked using the density of the interpolation points of the corresponding first cluster.

That is, when it is suspected that the clusters generated through the primary labeling in step 142 are not clusters generated from a single object, step 144 may be performed in order to check whether it is necessary to perform the secondary labeling.

Figure 13:
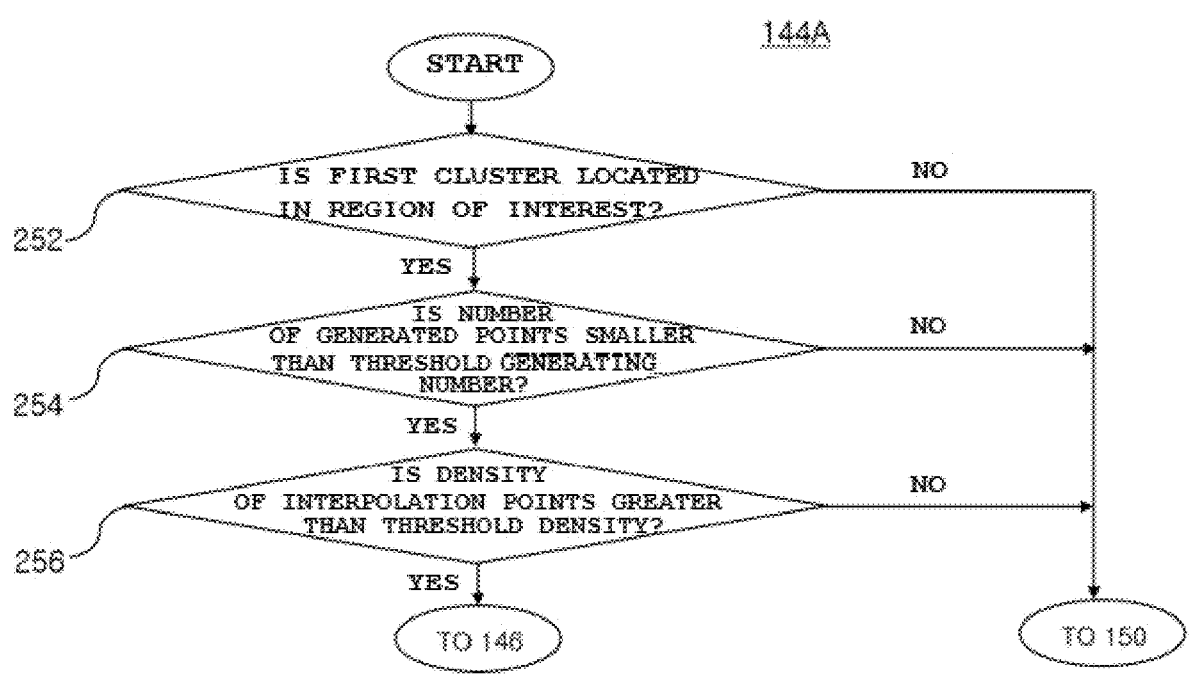
FIG. 13 is a flowchart showing an embodiment of step 144 shown in FIG. 12.

FIG. 13 is a flowchart showing an embodiment 144A of step 144 shown in FIG. 12.

Referring to FIG. 13, whether the first clusters are located in the region of interest is checked (step 252).

In addition, whether the number of points generated by the LiDAR sensor 500 among the points included in the first clusters is smaller than a threshold generating number is checked (step 254).

In addition, whether the density of interpolation points among the points included in the first clusters is greater than a threshold density is checked (step 246).

According to the embodiment, when at least one of step 252, step 254, or step 256 shown in FIG. 13 is satisfied, it is determined that a corresponding first cluster corresponds to the target cluster, and the process proceeds to step 146.

For example, as shown in FIG. 13, when any one cluster among the first clusters satisfies all of steps 252, 254 and 256, it may be determined that this cluster corresponds to the target cluster requiring the secondary labeling, and the process may proceed to step 146. On the other hand, when any one cluster among the first clusters does not satisfy any one of steps 252, 254 and 256, it may be determined that this cluster is a cluster that does not require the secondary labeling, and the process may proceed to step 150.

It is illustrated in FIG. 13 that steps 252, 254 and 256 are sequentially performed, but the embodiment is not limited thereto. That is, steps 252, 254 and 256 may be performed in any order.

In addition, at least one of the range of the region of interest, the threshold generating number, or the threshold density (hereinafter referred to as a "second threshold value") may be changed to have different values depending on the coordinate values of the first and second interpolation reference points.

According to the embodiment, the second threshold value may be tuned using a method similar to the above-described method in which the first threshold value is tuned. Since the method of tuning the first threshold value applies to the method of tuning the second threshold value, a duplicate description thereof will be omitted.

Examples of variables used to determine a tuning parameter, which is the second threshold value that is subject to learning and selection, are shown in Table 2 below.

TABLE 2

| Class. | Parameter Name | Unit | Value |
|---|---|---|---|
| 1 | LABELING_ROI | M | As minimum value of x values of voxel centers labeled with same ID, parameter associated with range of region of interest used in step 252 shown in FIG. 13 |
| 2 | LABELING_N_1 | Number | As total number of voxel points labeled with same ID, parameter associated with threshold generating number used in step 254 shown in FIG. 13 |
| 3 | LABELING_N_2 | — | As ratio of voxels generated by interpolation points to general voxels in voxels labeled with same ID, parameter associated with threshold density used in step 256 shown in FIG. 13 |

In Table 2, the range of the region of interest is based on the position at which the LiDAR sensor is mounted in the host vehicle.

Referring again to FIG. 12, the target cluster that has been primarily labeled is secondarily labeled in order to generate the second cluster (step 146). At this time, the interpolation points are excluded from the target cluster, and the target cluster not including the interpolation points is secondarily labeled. That is, the secondary labeling is not performed on the interpolation points.

At this time, according to the embodiment, the threshold value used to generate the first cluster (hereinafter referred to as a "first labeling threshold value") and the threshold value used to generate the second cluster (hereinafter referred to as "second labeling threshold value") are different from each other.

According to the embodiment, in order to realize clustering more effectively than through primary labeling, secondary labeling may be performed using the second labeling threshold value, which has been changed from the first labeling threshold value. To this end, the second labeling threshold value may be divided so as to have a smaller size than the first labeling threshold value.

Steps 142 and 144 shown in FIG. 12 may be performed on all of the first clusters on which step 146 has not been performed.

Figure 14:
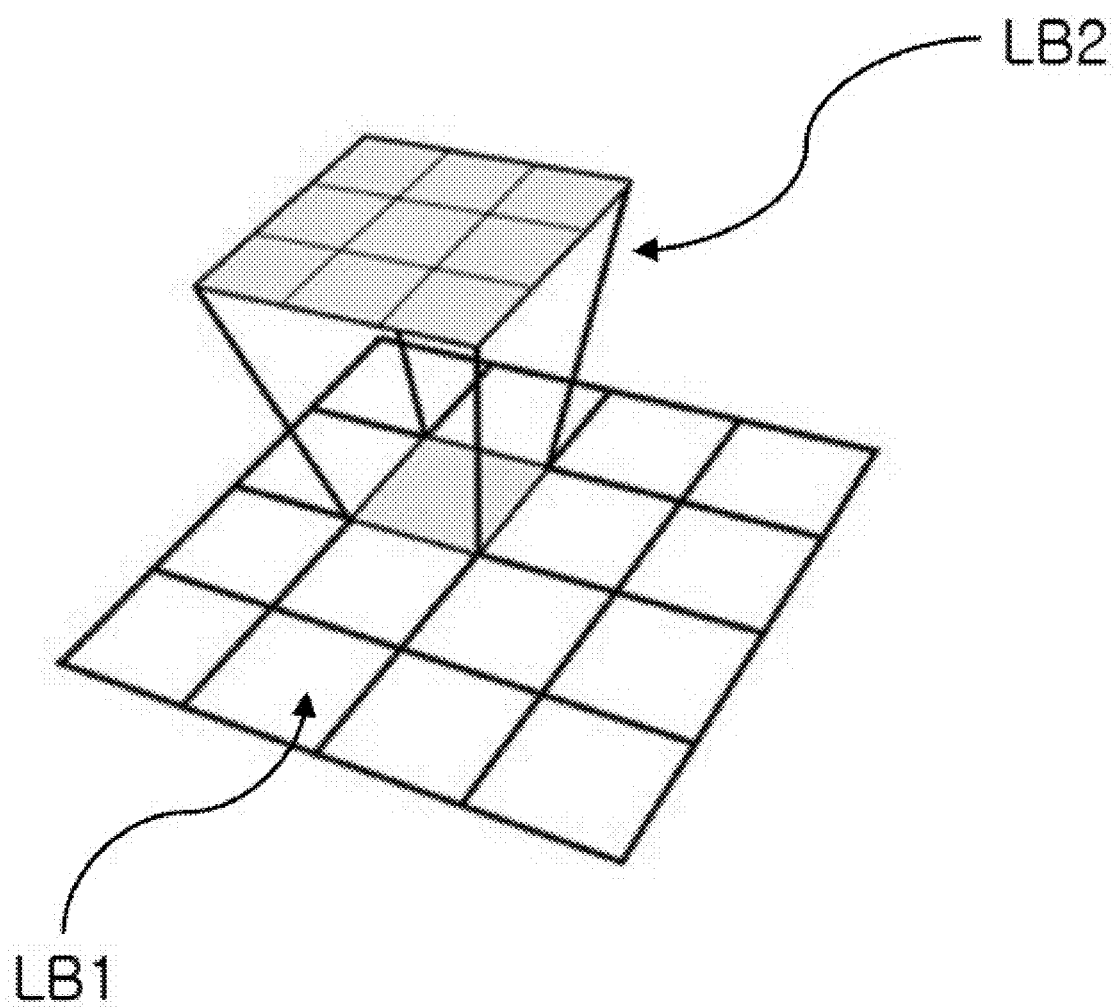
FIG. 14 exemplarily shows secondary labeling.

FIG. 14 exemplarily shows the secondary labeling.

As shown in FIG. 14, when the first cluster LB1 is determined to be the target cluster through the checking process shown in FIG. 13, the target cluster is disassembled, and the secondary labeling LB2 is performed thereon by applying a condition different from the primary labeling thereto.

Meanwhile, a recording medium in which a program for executing the method 100 of tracking an object using a LiDAR sensor is recorded may store a program to implement a function of checking points generated by the LiDAR sensor to determine first and second interpolation reference points when there are missing points associated with the object and a function of generating interpolation points to replace the missing points between the first interpolation reference point and the second interpolation reference point. The recording medium may be read by a computer system.

In addition, a recording medium in which a program for executing the method 100 of tracking an object using a LiDAR sensor is recorded may store a program to implement a function of performing primary labeling on segmented points including interpolation points to generate first clusters, a function of checking the density of the interpolation points to find a target cluster on which secondary labeling is to be performed among the first clusters, and a function of performing the secondary labeling on the target cluster to generate a second cluster. The recording medium may be read by a computer system.

The computer-readable recording medium includes all kinds of recording devices in which data capable of being read by a computer system are stored. Examples of the computer-readable recording medium include Read-Only Memory (ROM), Random Access Memory (RAM), Compact Disk ROM (CD-ROM), magnetic tape, floppy discs, and optical data storage. The computer-readable recording medium can also be distributed over network-connected computer systems so that the computer-readable code is stored and executed in a distributed fashion. Also, functional programs, code, and code segments for accomplishing the method 100 of tracking an object using a LiDAR sensor can be easily devised by programmers skilled in the art to which the present disclosure pertains.

Hereinafter, the configuration and operation of each of the segmentation unit 610 and the clustering unit 620 of the apparatus 1000 for tracking an object using a LiDAR sensor according to the embodiment will be described with reference to the accompanying drawings.

Figure 15:
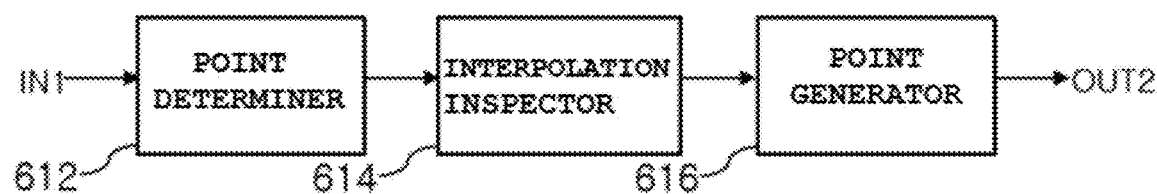
FIG. 15 is a block diagram of an embodiment of the segmentation unit shown in FIG. 2.

FIG. 15 is a block diagram of an embodiment 610A of the segmentation unit 610 shown in FIG. 2.

The segmentation unit 610A shown in FIG. 15 may perform step 130A shown in FIG. 3, but the embodiment is not limited thereto.

The segmentation unit 610A shown in FIG. 15 may include a point determiner 612, an interpolation inspector 614, and a point generator 616.

The point determiner 612 checks points generated by the LiDAR sensor, which are received through an input terminal IN1, determines first and second interpolation reference points when there is a missing point with respect to the object, and outputs the determined first and second interpolation reference points to the interpolation inspector 614. The point determiner 612 serves to perform step 132 shown in FIG. 3 and step 132A shown in FIG. 4.

The interpolation inspector 614 may check whether it is necessary to generate an interpolation point using the first and second interpolation reference points. The interpolation inspector 614 may perform step 134 shown in FIG. 3 and step 134A shown in FIG. 7.

The point generator 616 may generate an interpolation point to replace the missing point between the first and second interpolation reference points in response to the result of checking by the interpolation inspector 614, and may output the generated interpolation point to the clustering unit 620 through an output terminal OUT2. The point generator 616 serves to perform step 136 shown in FIG. 3.

Figure 16:
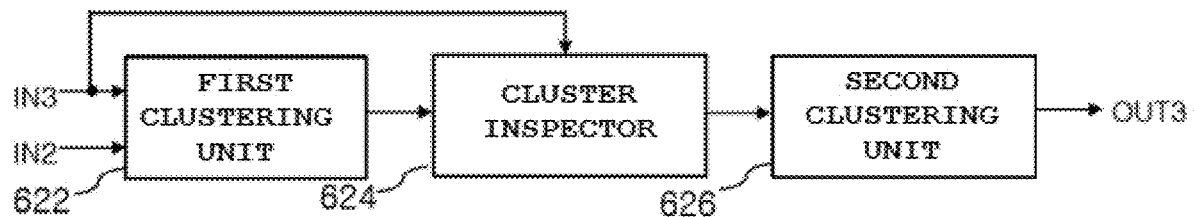
FIG. 16 is a block diagram of an embodiment of the clustering unit shown in FIG. 2.

FIG. 16 is a block diagram of an embodiment 620A of the clustering unit 620 shown in FIG. 2.

The clustering unit 620A shown in FIG. 16 finds a target cluster requiring secondary labeling, among the first clusters generated through primary labeling, and performs secondary labeling on the target cluster to generate a second cluster. That is, the clustering unit 620A shown in FIG. 16 serves to perform step 140A shown in FIG. 12.

To this end, the clustering unit 620A may include first and second clustering units 622 and 626 and a cluster inspector 624.

The first clustering unit 622 receives segmented points including interpolation points through an input terminal IN2, performs primary labeling on the segmented points using a first labeling threshold value to generate first clusters, and outputs the generated first clusters to the cluster inspector 624. In this way, the first clustering unit 622 serves to perform step 142 shown in FIG. 12.

The cluster inspector 624 finds a target cluster on which secondary labeling is to be performed among the first clusters using the density of the interpolation points, and outputs the found target cluster to the second clustering unit 626. To this end, the cluster inspector 624 may receive the first and second interpolation reference points from the segmentation unit 610 or 610A through an input terminal IN3, and may check whether a corresponding first cluster is the target cluster using the aforementioned second threshold value, which is changed depending on the first and second interpolation reference points. In this way, the cluster inspector 624 may perform step 144 shown in FIG. 12 and step 144A shown in FIG. 13.

The second clustering unit 626 may exclude the interpolation points from the target cluster, may perform secondary labeling on the target cluster not including the interpolation points using a second labeling threshold value, and may output the second cluster generated through the secondary labeling to the shape analysis unit 630 through an output terminal OUT3. In this way, the second clustering unit 626 serves to perform step 146 shown in FIG. 12.

Hereinafter, an object-tracking method according to a comparative example and the object-tracking method according to the embodiment will be described with reference to the accompanying drawings.

Figure 17A:
FIGS. 17A and 17B are diagrams showing an object-tracking method according to a comparative example.
Figure 17B:
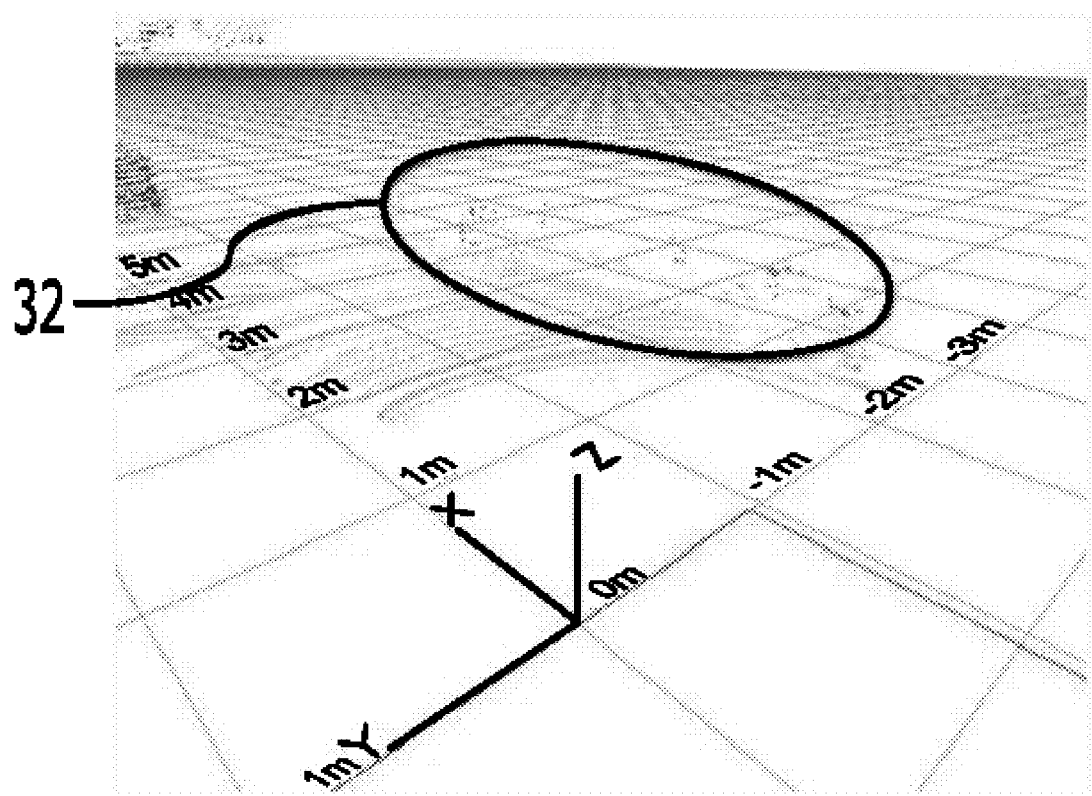

FIGS. 17A and 17B are diagrams showing an object-tracking method according to a comparative example.

As shown in FIG. 17A, other vehicles of various types may be present in the vicinity of the host vehicle. Among the other vehicles, a vehicle having a low height (e.g. a low sedan or sports car) may have low reflectance. Further, a vehicle to which paint having low reflectance is applied (e.g. a black vehicle) may also have low reflectance.

When a laser pulse is radiated to the lateral surface of another vehicle having low reflectance, the laser pulse may not return due to the low reflectance of the other vehicle, so points may be missing rather than being generated.

For example, as shown in FIG. 17A, when a laser pulse is radiated to the lateral surface of a sports car 30, which is black and has a low height, the laser pulse is not reflected from the other vehicle 30 due to the low reflectance thereof. Therefore, as shown in FIG. 17B, points are missing in a certain portion 32, and thus the density of the points associated with the other vehicle 30 is greatly reduced. The reduction in the density of the points associated with the other vehicle 30 deteriorates the performance of recognition of the other vehicle 30, resulting in deteriorated performance of tracking the other vehicle 30.

FIGS. 18A to 18C are diagrams showing a comparison between the comparative example and the embodiment.

As shown in FIG. 18A, when another vehicle 40, which is black, is located in the vicinity of the host vehicle in the area on the front lateral side of the host vehicle, many points associated with the other vehicle 40 may be missing due to the low reflectance of the other vehicle 40. At this time, according to the comparative example, as shown in FIG. 18B, even though the other black vehicle 40 is a single object, many points are missing rather than being generated on the lateral surface of the other black vehicle 40, and thus segmentation performance is deteriorated, whereby four separate clusters 42 are respectively generated for the vehicle body, the tire, the door, and the fender.

In contrast, according to the embodiment, when points are missing, interpolation points are generated, and a region in which points are missing is filled with the interpolation points in order to replace the missing points. For example, as shown in FIG. 18C, interpolation points are placed in the region in which points are missing, whereby segmentation function is improved, and thus a single cluster 44 is generated for the single other vehicle 40, rather than being divided.

As a result, compared to the comparative example, the embodiment is capable of minimizing or preventing the occurrence of over-segmentation, which may occur when an object has low reflectance. In addition, it is possible to increase the density of points associated with an object that does not have low reflectance, thereby minimizing or preventing the occurrence of over-segmentation. Improvement of segmentation performance may improve clustering performance, thereby improving the performance of recognizing an object and thus improving a function of tracking an object.

FIGS. 19A to 19C are diagrams showing an example of prevention of under-segmentation.

For various reasons, under-segmentation may occur. Here, the term "under-segmentation" refers to a phenomenon in which several objects are recognized as a single object. For example, in the object-tracking method 100 according to the embodiment, when interpolation points are generated in order to replace missing points to thus prevent over-segmentation, under-segmentation may occur.

In one example, FIG. 19A shows a plurality of road guide posts 50 as objects. Although the multiple road guide posts 50 are not a single object, one cluster 52 may be generated due to under-segmentation, as shown in FIG. 19B.

In order to prevent this, according to the embodiment, among first clusters generated through primary labeling, a target cluster is found using the density of interpolation points, and then the target cluster is again clustered through secondary labeling to generate a second cluster. When the labeling processes are performed, the second labeling threshold value is divided so as to have a smaller size than the first labeling threshold value. Thus, secondary labeling is performed more strictly than primary labeling, whereby the occurrence of under-segmentation may be minimized or prevented. Accordingly, according to the embodiment, clustering performance may be improved, and thus the likelihood of misrecognizing an object may be reduced, whereby a function of tracking an object may be improved.

For example, when secondary labeling is performed on the first cluster 52 shown in FIG. 19B, a plurality of second clusters 54 corresponding to the plurality of road guide posts 50 may be generated, as shown in FIG. 19C.

As is apparent from the above description, according to a method and apparatus for tracking an object using a LiDAR sensor and a recording medium storing a program to execute the method according to embodiments, it is possible to minimize or prevent the occurrence of over-segmentation, which may occur when an object has low reflectance. In addition, it is possible to increase the density of points associated with an object that does not have low reflectance, thereby minimizing or preventing the occurrence of over-segmentation. Improvement of segmentation performance may improve clustering performance, thereby improving the performance of recognizing an object and thus improving a function of tracking an object. In addition, secondary labeling is performed in order to minimize or prevent the occurrence of under-segmentation, whereby clustering performance may be improved and the performance of recognizing an object may be improved, and accordingly, a function of tracking an object may be further improved.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method for tracking an object, the method comprising:
checking points generated by a LiDAR sensor to determine a first interpolation reference point and a second interpolation reference point among the points generated by the LiDAR when points, associated with the object, are missing,
wherein the first interpolation reference point is determined by:
determining a candidate for the first interpolation reference point,
checking whether the candidate is a point that is recognizable as the object, and
determining that the candidate is the first interpolation reference point based on a result of the checking, and
wherein the second interpolation reference point is determined by:
subsequent to determining the first interpolation reference point, checking whether there is a missing point, and
when the missing point exists, generating another point and determining that the other point is the second interpolation reference point;
generating interpolation points to replace the missing points between the first interpolation reference point and the second interpolation reference point;
performing primary labeling on segmented points including the interpolation points to generate first clusters;
checking a density of the interpolation points to find a target cluster on which secondary labeling is to be performed among the first clusters; and
performing the secondary labeling on the target cluster to generate a second cluster, wherein the secondary labeling is performed on the target cluster after excluding the interpolation points.

2. The method according to claim 1, wherein a first labeling threshold value used to generate the first clusters and a second labeling threshold value used to generate the second cluster are different from each other.

3. The method according to claim 2, wherein the second labeling threshold value is divided so as to have a smaller size than the first labeling threshold value.

4. The method according to claim 1, wherein finding the target cluster comprises:
checking whether the first clusters are located in a region of interest;
checking whether a number of points generated by the LiDAR sensor among points included in the first clusters is smaller than a threshold generating number; or
checking whether the density of the interpolation points among the points included in the first clusters is greater than a threshold density.

5. The method according to claim 4, wherein the target cluster is selected from among the first clusters using a result of the checking of whether the first clusters are located in the region of interest, the checking of whether the number of points generated by the LiDAR sensor among the points included in the first clusters is smaller than the threshold generating number, or the checking of whether the density of the interpolation points among the points included in the first clusters is greater than the threshold density.

6. The method according to claim 4, wherein a range of the region of interest, the threshold generating number, or the threshold density is changed based on the first interpolation reference point and the second interpolation reference point.

7. The method according to claim 1, further comprising:
checking a scan pattern of the points generated by the LiDAR sensor; and
when it is determined that the missing points are in a same scan section based on results of the checking, determining the first interpolation reference point and the second interpolation reference point.

8. The method according to claim 7, further comprising checking whether it is necessary to generate the interpolation points based on the first interpolation reference point and the second interpolation reference point.

9. The method according to claim 8, wherein checking whether it is necessary to generate the interpolation points comprises:
checking whether a target layer to which the missing points belong is within a threshold layer range;
checking whether a number of the missing points is greater than a threshold missing number;
checking whether a spacing distance between the first interpolation reference point and the second interpolation reference point is longer than a threshold spacing distance; or
checking whether the first interpolation reference point and the second interpolation reference point are located in a region of interest.

10. The method according to claim 9, wherein whether to generate the interpolation points is determined using a result of the checking of whether the target layer to which the missing points belong is within the threshold layer range, the checking of whether the number of the missing points is greater than the threshold missing number, the checking of whether the spacing distance between the first interpolation reference point and the second interpolation reference point is longer than the threshold spacing distance, or the checking of whether the first interpolation reference point and the second interpolation reference point are located in the region of interest.

11. The method according to claim 9, wherein the threshold layer range, the threshold missing number, the threshold spacing distance, or a range of the region of interest is changed based on the first interpolation reference point and the second interpolation reference point.

12. The method according to claim 1, wherein the interpolation points are generated so as to be spaced apart from each other at regular intervals in an imaginary straight line interconnecting the first interpolation reference point and the second interpolation reference point.

13. An apparatus for tracking an object, the apparatus comprising:
a segmentation unit configured to segment points generated by a LiDAR sensor to generate segmented points, the segmentation unit comprising:
a point determiner configured to check the generated points in order to determine a first interpolation reference point and a second interpolation reference point among the points generated by the LiDAR in response to missing points associated with the object,
wherein the first interpolation reference point is determined by:
determining a candidate for the first interpolation reference point,
checking whether the candidate is a point that is recognizable as the object, and
determining that the candidate is the first interpolation reference point based on a result of the checking, and
wherein the second interpolation reference point is determined by:
subsequent to determining the first interpolation reference point, checking whether there is a missing point, and
when the missing point exists, generating another point and determining that the other point is the second interpolation reference point;
an interpolation inspector configured to check whether it is necessary to generate interpolation points based on the first interpolation reference point and the second interpolation reference point; and
a point generator configured to generate the interpolation points to replace the missing points between the first interpolation reference point and the second interpolation reference point in response to a result of the check by the interpolation inspector; and
a clustering unit configured to cluster the segmented points, the clustering unit comprising:
a first clustering unit configured to perform primary labeling on the segmented points including the interpolation points to generate first clusters;
a cluster inspector configured to check a density of the interpolation points to find a target cluster on which secondary labeling is to be performed among the first clusters; and
a second clustering unit configured to perform the secondary labeling on the target cluster to generate a second cluster, wherein the secondary labeling is performed on the target cluster after excluding the interpolation points.

14. The apparatus according to claim 13, wherein a first labeling threshold value used to generate the first clusters and a second labeling threshold value used to generate the second cluster are different from each other.

15. A non-transitory computer-readable recording medium storing a program for executing instructions for tracking an object on a computer using a LiDAR sensor, the instructions comprising:
checking points generated by the LiDAR sensor to determine a first interpolation reference point and a second interpolation reference point among the points generated by the LiDAR in response to missing points associated with the object,
wherein the first interpolation reference point is determined by:
determining a candidate for the first interpolation reference point,
checking whether the candidate is a point that is recognizable as the object, and
determining that the candidate is the first interpolation reference point based on a result of the checking, and
wherein the second interpolation reference point is determined by:
subsequent to determining the first interpolation reference point, checking whether there is a missing point, and
when the missing point exists, generating another point and determining that the other point is the second interpolation reference point;
generating interpolation points to replace the missing points between the first interpolation reference point and the second interpolation reference point;
performing primary labeling on segmented points including the interpolation points to generate first clusters;

checking a density of the interpolation points to find a target cluster on which secondary labeling is to be performed among the first clusters; and performing the secondary labeling on the target cluster to generate a second cluster, wherein the secondary labeling is performed on the target cluster after excluding the interpolation points.

16. The non-transitory computer-readable recording medium according to claim 15, wherein a first labeling threshold value used to generate the first clusters and a second labeling threshold value used to generate the second cluster are different from each other.

17. The non-transitory computer-readable recording medium according to claim 16, wherein the second labeling threshold value is divided so as to have a smaller size than the first labeling threshold value.

* * * * *